United States Patent [19]
Hickey

[11] 3,884,569
[45] May 20, 1975

[54] SLIDE TRAY AND SLIDE POSITIONING MECHANISM FOR A REAR-SCREEN PROJECTOR

[75] Inventor: Roy E. Hickey, Honeoye Falls, N.Y.
[73] Assignee: The Singer Company, New York, N.Y.
[22] Filed: May 29, 1973
[21] Appl. No.: 364,399

[52] U.S. Cl. ............... 353/88; 353/92; 353/111
[51] Int. Cl. ............... G03b 21/14; G03b 23/02
[58] Field of Search ......... 353/88, 92, 95, 111, 117

[56] References Cited
UNITED STATES PATENTS

| | | | |
|---|---|---|---|
| 2,922,334 | 1/1960 | Krull | 353/111 |
| 3,138,062 | 6/1964 | Maiershofer | 353/88 |
| 3,276,314 | 10/1966 | Robinson | 353/111 |
| 3,411,845 | 11/1968 | Pester et al. | 353/88 |
| 3,507,571 | 4/1970 | White | 353/78 |
| 3,594,078 | 7/1971 | Hall | 353/111 |

Primary Examiner—Richard E. Aegerter
Assistant Examiner—Steven L. Stephan

[57] ABSTRACT

A slide projector located within a rear-screen projector housing includes a slide tray and slide positioning mechanism in cooperative relation with a gravity feed slide tray which is removably mounted on the rear-screen projector housing. The projector includes a gate having a shutter mounted for rotation to a first position blocking the optical path of the projector and for rotation to a second position at which the optical path is not blocked; indexing means rotate the slide tray relative to the projector gate to successively bring slides in the slide tray, one at a time, in registration with the projector gate; first means operating in time relation with the indexing means successively feeds the slides from the slide tray into the gate, under the influence of gravity, for projection by the projector and then back into the slide tray; and second means in time relation with the indexing means causes the shutter to be in its first position blocking the optical path of the projector in response to the absence of a slide in the projector gate and also causes the shutter to be in its second position enabling the optical path of the projector whenever a slide is present in the projector gate.

15 Claims, 19 Drawing Figures

SLIDE TRAY AND SLIDE POSITIONING MECHANISM FOR A REAR-SCREEN PROJECTOR

BACKGROUND OF THE INVENTION

1. Field Of The Invention

This invention relates to slide tray and slide positioning mechanisms and more particularly to slide tray and slide positioning mechanisms that are contained within a rear-screen projector housing but in cooperative relation with a slide tray removably mounted on the exterior of the rear-screen projector housing.

2. Description Of The Prior Art

Heretofore in the prior art, most rear-screen projectors have utilized standard slide projectors designed for projecting an image onto the front of a screen disposed in a room. The standard slide projector is typically contained within the rear-screen projector and its projected image folded one or more times by mirror(s) before being projected onto the rear of a viewing screen contained in one side of the rear-screen projector housing. This arrangement results in the rear-screen projector housing having to be at least large enough to enclose the standard slide projector. Not only does this result in a relatively large and bulky rear-screen projector that is cumbersome to handle, but the image bearing slides associated with the projector and the operating mechanisms of the standard projector are not readily available to the user since they are contained within the rear-screen projector housing.

Accordingly, one object of this invention is to provide an improved rear-screen projector.

Another object of this invention is to provide a self-contained slide tray and slide positioning mechanism for a rear-screen projector.

Still another object of this invention is to provide an improved slide tray and slide positioning mechanism that is contained within a rear-screen projector and in cooperative relation with a slide tray removably mounted on the exterior of the rear-screen projector housing.

SUMMARY OF THE INVENTION

Briefly described, the present invention includes indexing means adapted to rotate a slide tray, containing a plurality of image bearing slides, relative to a projector gate for successively bringing slides in the slide tray into vertical registration with the projector gate. First means operating in timed relation with the indexing means successively feeds the slides into the projector gate for projection and then back into the slide tray. Second means in timed relation with the indexing means causes a shutter to block the optical path of the projector in the event that a slide is not contained within the projector gate at the time that image projection is to take place. The indexing means includes a driven indexing bar having a slide tray indexing element at one end thereof; means in contact with the driven indexing bar guides the indexing element to a position between two adjacent indexing pins depending from the slide tray, after which a pivoted means causes the driven indexing bar to be rotated around the pivot of the pivot means to rotate the slide tray thereby causing the next slide in the tray to be positioned above the projector gate. The second means includes means biasing the shutter in a position wherein the optical path of the projector is not blocked by the shutter; means in timed relation with the indexing means for rotating the shutter around its rotational axis to a position, in opposition to the biasing means, in which the optical path of the projector is blocked and then enabling counter-rotation of the shutter around its rotational axis to its original position which does not block the optical path, under the urging of the biasing means; and means for sensing the absence of a slide in the projector gate for latching the means for rotating the shutter in the position wherein the shutter blocks the optical path, and for enabling the return of the shutter to its initial position for which the optical path is not blocked when a slide is in the projector gate.

More specifically, the projector gate and slide tray and slide positioning mechanism are contained within a rear-screen projector housing with the slide tray removably mounted on the exterior of the rear-screen projector housing. The image projected by the projector is folded one or more times within the housing by mirror(s) before being projected onto the rear of a viewing screen contained in a wall of the rear-screen projector housing. Manually actuated push buttons mounted on the housing enable selective actuation of the projector slide tray and slide positioning mechanism. Alternately, the slide tray and slide positioning mechanism can be controlled by manually generated electrical signals or by electrical signals generated by a magnetic tape drive which may also be contained within the rear-screen projector housing.

BRIEF DESCRIPTION OF THE DRAWINGS

The various features, objects and advantages of the present invention will be readily apparent from the following detailed description taken in conjunction with the following drawings, wherein like reference characters designate like or corresponding parts throughout the several views, and wherein.

DESCRIPTION OF THE INVENTION

Figures 1, 2A, 2B, 4:
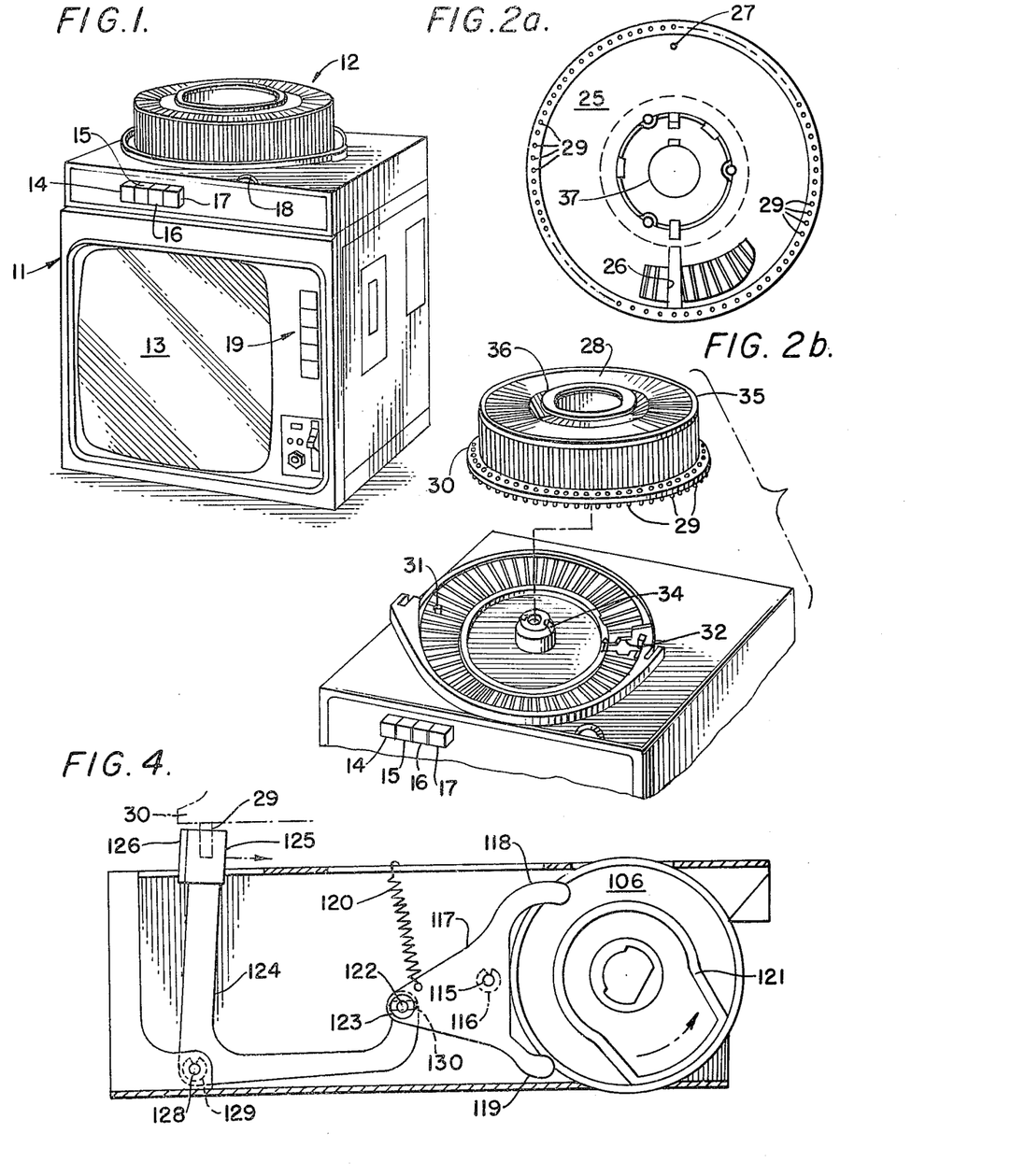
FIG. 1 is a perspective view of a rear-screen projector whcih may utilize the present invention.
FIG. 2a illustrates the bottom of the slide tray used with the rear-screen projector of FIG. 1.
FIG. 2b illustrates the top surface of the rear-screen projector and the slide tray with which it cooperates.
FIG. 4 illustrates the slide tray locator portion of the slide tray and slide positioning mechanism of this invention.

Apparatus which may utilize the present invention is shown in FIG. 1 as comprising a rear-screen projector having a housing 11 in the general shape of a cube. A gravity feed slide tray 12, such as that used with a Kodak Carousel projector, is removably mounted on the top of the rear-screen projector. Located within the housing 11 beneath the slide tray 12 is a slide tray and slide positioning mechanism (not shown FIG. 1) in accordance with this invention and having a slide projector optical system associated therewith. As will be described below in detail, the slide projector projects the image of successive slides in the slide tray onto the rear of a viewing screen 13 contained in the front of the rear-screen projector housing 11. Since the screen 13 is located near the image being projected, it is necessary that the path of the projected image be folded one or more times before being displayed on the screen 13. This is accomplished by the use of one or more mirrors (not shown FIG. 1) within the housing 11 in a well known manner. This enables a much larger image to be obtained on the viewing screen 13 than could be obtained within the confines of the projector housing 11 without folding the optical path of the projector image.

The slide tray and slide positioning mechanism can be controlled by a plurality of manually actuated, push buttons 14, 15, 16 and 17 located above the viewing screen 13. Push button 14 actuates an ON-OFF switch which controls electrical power to the rear-screen projector. Manually actuated push button 15 is an ADVANCE device which causes the next slide in the slide tray to be projected onto the viewing screen 13. If the ADVANCE push button 15 is held in the depressed state, the slide tray will continue to advance resulting in successive slides being projected, in sequence, onto the viewing screen 13. Manually actuated push button 16 provides a SELECT control. When actuated, the SELECT push button 16 disables the automatic slide tray indexing means and allows the slide tray 12 to be manually located to any desired position. Manually actuatable push button 17 provides a HOLD function which, when actuated, disables the automatic slide tray indexing means to prevent projection of successive slides in the slide tray 12 until release of the HOLD push button 17.

The rear-screen projector housing 11 may also enclose a cassette tape deck, (not shown) the standard control buttons 19 for which are shown as being located to the right of the viewing screen 13. In addition to providing audio accompanyment to the images projected on the viewing screen 13, the cassette tape may also include a cue tract that provides electrical pulses for actuating the slide tray and slide positioning mechanism to control the sequence of slide images projected onto the viewing screen 13 in synchronism with the audio.

Additionally, a hand held switch (not shown) connected to the rear-screen projector by an electrical cable (not shown) may be utilized to control the slide tray and slide positioning mechanism of this invention.

A control knob 18 extending from the top of the rear-screen housing provides a focus adjustment for the image projected onto the viewing screen 13.

THe gravity feed slide tray 12 and the cooperative relationship between the slide tray 12 and the top of the rear-screen projector is substantially identical to that described in U.S. Pat. No. 3,276,156 filed Feb. 23, 1962 in the name of Herbert T. Robinson, the disclosure of which is incorporated herein by reference. Briefly described, however, and as shown in FIGS. 2a and 2b, the slide tray 12 contains a first portion 25, such as an annular disk, having an opening therein 26 through which successive slides contained in the slide tray may pass and another opening 27 for properly locating the slide tray 12 on the top of the rear-screen projector. A second portion 28 of the slide tray includes inner 36 and outer 35 concentric walls with a plurality of separators connected therebetween to form slide compartments and is rotatably coupled to the first portion 25. Additionally, the second portion contains a plurality of indexing pins 29 depending from a rim 30 thereon which enable the second portion 28 to be rotated relative to the first portion 25 in a manner as described hereinbelow.

An opening 37 in the center of the slide tray 12 is designed to fit over a spindle 34 protruding from the top of the rear-screen projector. A positioning pin 31 projecting from the top of the rear-screen projector engages the opening 27 in the first portion 25 of the slide tray 12 to accurately locate the slide tray on the top of the rear-screen projector and retain the first portion 25 of the slide tray 12 in a fixed position. An opening 32 in the top of the rear-screen projector is located above the projector gate (not shown FIGS. 2a and 2b) within the rear-screen housing 11 and below the opening 26 in the slide tray 12. When indexed by the slide tray and slide positioning mechanism described hereinbelow, successive slides in the slide tray 12 are positioned over the opening 26 in the slide tray 12 which is located over the opening 32 in the rear-screen projector 11 such that successive slides are lowered into the projector gate 62 (FIG. 3a) and projected onto the screen 13 of the rear-screen projector and then placed back in the slide tray 12.

Figure 3A:
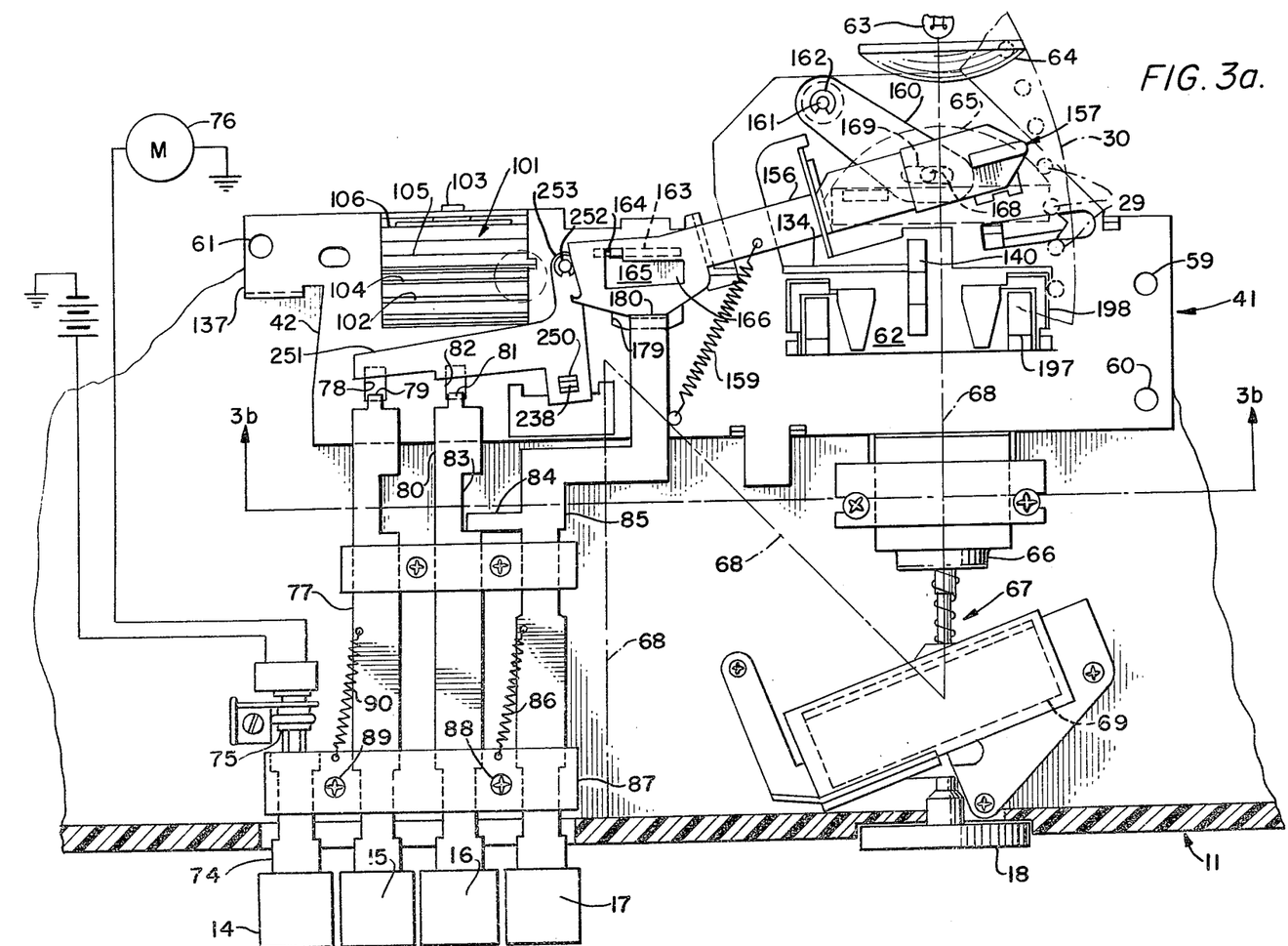
FIG. 3a illustrates the slide tray and slide positioning mechanism of this invention in the optical path of the rear-screen projector of FIG. 1.
Figure 3B:
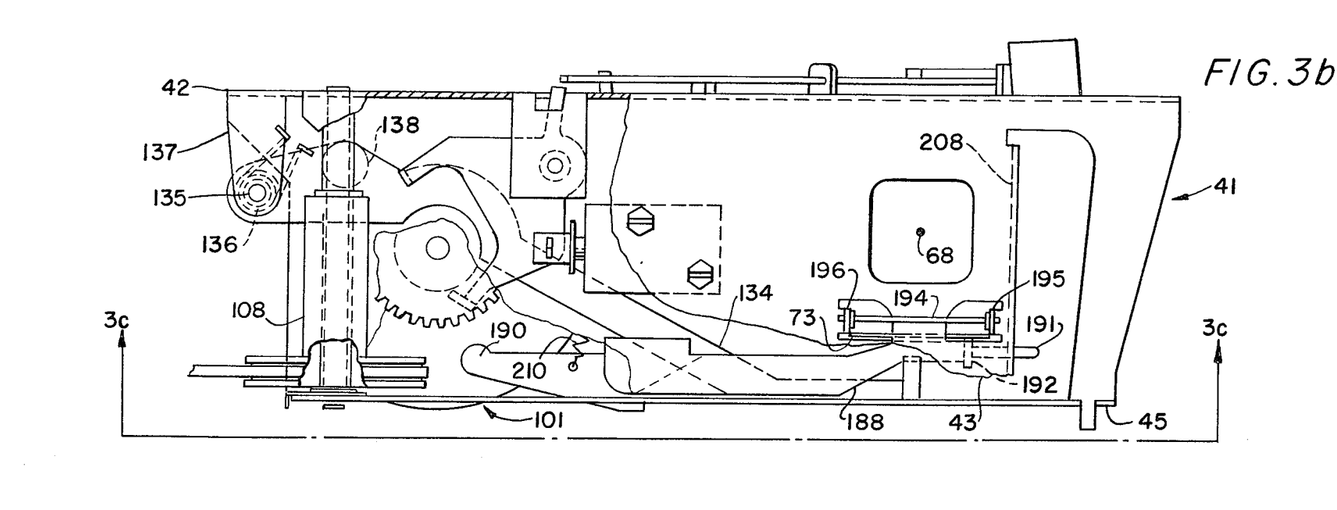
FIG. 3b illustrates the slide tray and slide positioning mechanism portion of FIG. 3a looking in the direction of arrows b—b.
Figure 3C:
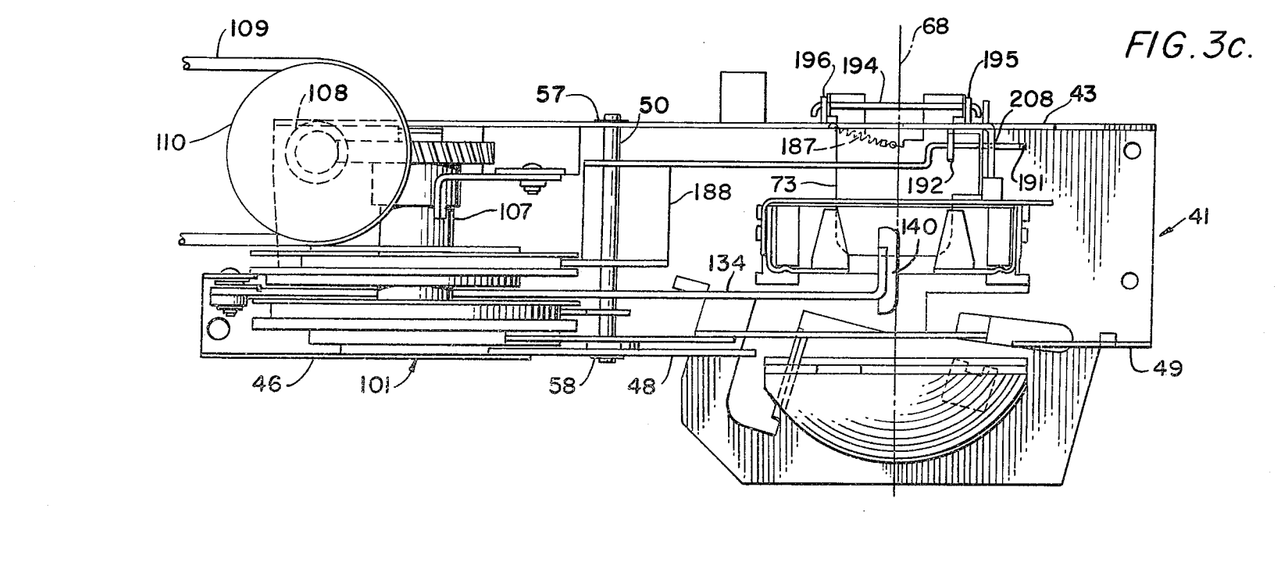
FIG. 3c illustrates the slide tray and slide positioning mechanism of FIG. 3b looking in the direction of the arrows c—c.

REferring now to FIGS. 3a, 3b and 3c, the slide tray and slide positioning mechanism of this invention is illustrated as including an elongated rectangular housing 41 including a plurality of flat side members 42, 43, 45, 46, 48 and 49 which can be secured together by any number of well known means (not shown). A spindle or shaft 50 extends through side numbers 48 and 43 and is retained in position by retaining rings 57 and 58 secured to opposite ends thereof. The rectangular housing 41 is mounted to the underside of the top of the rear-screen projector housing by means of the openings 59, 60 and 61 on the side member 42 by any number of well known means (not shown).

A projector gate 62 is located in the right hand portion of the housing 41 and is positioned under the opening 32 in the top of the rear-screen projector housing (FIG. 2a). An electric lamp 63 is located behind the projector gate 62 with condenser lens 64 and 65 being located between the projector lamp 63 and the projector gate 62. Mounted in front of the projector gate 62, in line with the optical path 68 of the projector is an objective lens barrel 66 having an adjustable focusing mechanism 67 attached thereto which is coupled to the focusing control knob 18. Since the image on a slide is projected onto the rear of the viewing screen 13, the light from the projector lamp 63 is projected through a slide (not shown) in the projector gate 62, through a mirror system and onto the viewing screen 13. The projector gate 62 includes a shutter 73 (FIGS. 3b and 3c) having a position as shown wherein the projector optical path 68 is not blocked and another position (not shown FIGS. 3a, 3b and 3c) for which the optical path 68 is blocked, as is discussed below, thereby preventing projection of an image onto the screen 13 (FIG. 1). Located at an angle to the optical path 68 of the projector is a mirror 69 which is secured to the rear-screen projector housing 11 by any number of well known means (not shown). This mirror may be adjustably mounted in a manner as described in a co-pending application entitled ADJUSTABLE MIRROR MOUNT filed May 29, 1973 and having Ser. No. 364,471. The mirror 69 folds the optical path 68 of the projector by projecting the optical path 68 beneath the rectangular housing 41 toward the rear of the rear-screen projector housing 11 to a second mirror (not shown) the surface of which is parallel to the mirror 69. The second mirror directs the optical path 68 onto the rear of the viewing screen 13.

In order to clearly illustrate the slide tray and slide positioning mechanism, all of the elements are not illustrated in FIGS. 3a, 3b and 3c. Further, elements or parts shown in one Figure, for purposes of clarity, do not appear in another Figure. However, FIGS. 3a, 3b and 3c taken together with FIGS. 4, 5a, 5b, 5c, 5d, 6, 7a, 7b, 8a, 8b, 8c and 9 constitute a clear and complete illustration of the features of the slide tray and slide positioning mechanism of this invention.

Located at the left hand portion of the housing 41 are the manually actuated push buttons 14, 15, 16 and 17 discussed hereinabove in conjunction with FIG. 1. ON-OFF push button 14 (FIG. 3a) contains a flat elongated member 74 extending into the rear-screen projector housing 11. Actuation of the ON-OFF push button 14 causes actuation of an electrical switch 75 which is in contact with member 74 and which controls application of electrical power to the rear-screen projector components such as the projector lamp 63 and an electric motor 76, etc. The ADVANCE push button 15 includes an elongated member 77 having a depending portion 79 at the end thereof which extends into an opening 78 in the side 42 of the housing 11. The ADVANCE push button 15 is biased to its normal position by a spring 90 connected between the elongated member 77 and a retaining and positioning member 87 secured to the rear-screen projector housing 11 by any number of suitable means such as the screws 88 and 89. The extent of movement of the ADVANCE push button 15 is controlled by the opening 78. In like manner, the SELECT push button 16 contains an elongated member 80 having a depending portion 81 at one end thereof that extends into an opening 82 in the side member 42. The elongated member 80 contains an indented portion 83 into which extends a dog 84 that laterally extends from an elongated portion 85 associated with the HOLD push button 17. As will be obvious from a perusual of FIG. 3a, actuation of the SELECT push button 16 also causes actuation of the HOLD push button 17 while actuation of the HOLD push button 17 does not cause actuation of the SELECT push button 16. Accordingly, only a single biasing spring 86 connected between the elongated member 85 of the HOLD push button 17 and the retaining member 87 is needed to bias both the SELECT 16 and HOLD 17 push buttons to their normal positions. The portion 85 of the HOLD push button 17 also contains a dependent portion 180 at the end thereof that extends into an opening 179 in the side member 42.

Also located in the left portion of the rectangular housing 41 is a cam block (FIG. 3a) 101 including a plurality of cams 106, 104, 105 and 102 which are operatively associated with a tray locator portion, slide lifter portion, tray indexing portion and shutter and slide clamp portion, respectively, of the slide tray and slide positioning mechanism of this invention. The cam block 101 is rotatably mounted on a shaft 103 which extends through the rectangular housing 41 and is driven by a wrap spring clutch FIG. 3c) 107 which in turn is driven through worm gearing 108 which is coupled to and driven by the motor 76 by any suitable means (not completely shown), such as a belt 109 and pulley 110 assembly.

When actuated by closing the clutch 107, rotation of the cam block 101 through 360° constitutes one complete cycle of operation of the slide tray and slide positioning mechanism. During a cycle of operation, and image bearing slide within the projector gate 62, if any, is returned to the slide tray 12, the slide tray 12 indexed and the next image bearing slide lowered into the projector gate 62 for projetion on the screen 13. In the event that the next position of the slide tray 12 does not contain a slide, the shuttter 73 will block the optical path 68 of the projector (FIG. 7a) to prevent illumination of the screen 13. The slide tray and slide positioning mechanism also has a half cycle position in which the slide, if any, in the gate is returned to the slide tray and the slide tray indexing means disabled and the tray locator retractor to enable the slide tray to be manually rotated.

The operation of the slide tray locator portion of the slide tray and slide positioning mechanism of this invention can best be understood with reference to FIG. 4 taken in conjunction with FIGS. 3a and 3c. As shown in FIGs. 4, a cam follower 117, rotatably mounted within the housing 41 on side wall 48 by any number of well known means, such as a stud 115 and retaining ring 116, includes two cam cooperating portions 118 and 119. An L-shaped detent lever 124 is rotatably secured to the side 49 of the rectangular housing 41 by any suitable means, such as a stud 128 and retaining ring 129. One end of the L-shaped detent lever is rotatably and slidably coupled to the cam follower 117 at a location remote from the cam cooperating portions 118 and 119 by any well known means such as a stud 122 and retaining ring 123 in slot 130. The other end of the L-shaped detent lever contains a detent 125 which includes a bevelled portion 126. A spring 120 coupled between the body of the cam follower 117 and the side 42 of the rectangular housing 41 retains the cam follower 117 and L-shaped detent lever 124 in their normal positions.

FIG. 4 shows the cam 106, cam follower 117 and detent lever 124 in their initial at rest positions at the start of a projector cycle. For this position, the cam cooperating portions 118 and 119 of the cam follower 117 do not engage any portion of the camming surface 121 of cam 106. In this initial position, the detent 125 is located between two indexing pins 29, depending from the slide tray 12 to secure the slide tray 12 in a fixed position.

The detent 125 remains in this position locking the slide tray during the beginning of the projector cycle until the cam cooperating portion 118 of cam follower 117 is contacted by the camming surface 121 portion of cam 106 which is rotating in a counter-clockwise direction (FIG. 4). Prior to this time, and as described hereinbelow, the slide tray indexing portion of the slide tray and slide positioning mechanism will hold the slide tray 12 in position. Contact of the camming surface 121 of cam 106 with the cam cooperating portion 118 of the cam follower 117 results in counter-clockwise rotation of the cam follower 117 in opposition to the spring 120. This in turn results in clockwise rotation of the L-shaped detent lever 124 around the pin 128 thereby withdrawing the detent 125 from between two adjacent indexing pins 29 depending from the slide tray 12. Continued rotation of the cam 106 will result in the detent 125 being positioned away from and out of engagement with the indexing pins 29 depending from the slide tray 12 as long as the camming surface 121 contacts the cam cooperating portion 118 of the cam follower 117. During this time period and as is described hereinbelow, the slide tray indexing portion of the slide tray and slide positioning mechanism of this invention will index the slide tray 12 causing the next slide to be brought into position over the projector gate 62.

After the camming surface 121 of cam 106 has disengaged the cam cooperating portion 118 of the cam follower 117, the camming surface 121 engages the cam cooperating portion 119 of cam follower 117 to cause clockwise rotation of the cam follower 117 in cooperation with the spring 120. This results in counter-clockwise rotation of the L-shaped detent lever 124 thereby causing the detent 125 to be driven into position between two indexing pins 29 depending from the slide tray 12 thereby locking the slide tray 12 in place. After rotation of the camming surface 121 of the cam 106 past the cam cooperating portion 119 of the cam follower 117, the spring 120 retains the cam follower 117 and the L-shaped detent lever 124 in their initial positions wherein the detent 125 locks the slide tray 12 in position.

As will be obvious from the above description, the cam 106 both positively drives the detent 125 from between two indexing pins 29 depending from the slide tray 12 and also positively drives the detent 125 between two adjacent indexing pins 29 depending from the slide tray 12.

Figure 6:
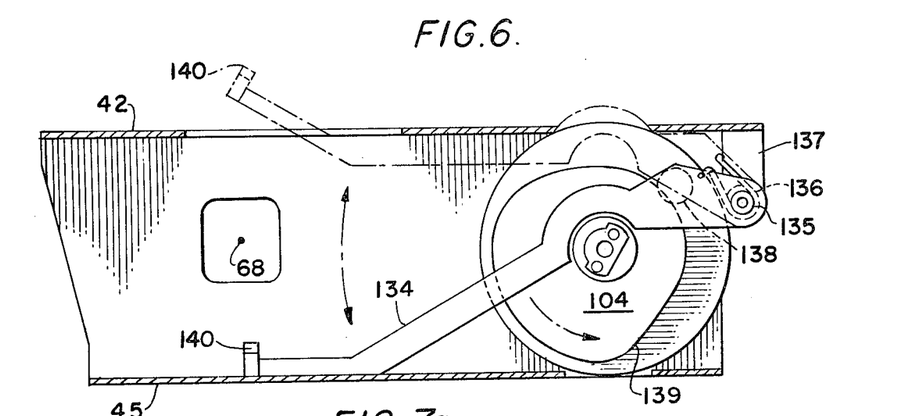
FIG. 6 illustrates the slide lifter portion of the slide tray and slide positioning mechanism of this invention.

The slide lifting portion of the slide tray and slide positioning mechanism of this invention can best be understood with reference to FIG. 6 taken in conjunction with FIGS. 3a, 3b and 3c. The slide lifter includes an elongated, flat member 134 having one end thereof rotatably mounted on a shaft 135 which is secured to a tab 137 depending from the side 42 of the rectangular housing 41. A spring 136 having one or more turns is positioned around the shaft 135 between the tab 137 and the slide lifting member 134. One end of the spring 136 is secured to the tab 137 while the other end of the spring 136 is secured to the slide lifting member 134. The spring 136 urges the elongated slide lifter member 134 in a direction counter-clockwise around the shaft 135 (FIG. 6). However, counter-clockwise movement of the slide lifting member 134 is limited by a circular cam follower surface 138 extending laterally from the slide lifting member 134 and which is urged into contact with the camming surface 139 of cam 104 by the spring 136.

A bevelled slide lifting element 140 is secured to the other end of the slide lifting member 134 such that the longitudinal axis of the slide lifting element 140 is substantially perpendicular to the longitudinal axis of the elongated slide lifting member 134. As shown, the bevelled slide lifting element 140 is located beneath the optical path 68 of the projector at the projector gate 62.

Initially, counter-clockwise rotation of the cam 104 (FIG. 6) has no affect on the slide lifter element 140. However, continued rotation of cam 104 causes clockwise rotation of the cam lifter element 140 and elongated member 134 around the shaft 135. Any slide in the projector gate 62 at this time will be contacted along its bottom edge by the slide lifting element 140 and raised into the slide tray. When the cam follower 104 is in contact with the longest constant diameter portion of the camming surface 138 of the cam 104 (dotted outline FIG. 6), the slide lifting element 140 is positioned just within the opening 26 in the bottom of the slide tray 12 (FIG. 2). During this time, the slide tray 12 can be indexed by the indexing mechanism described hereinbelow or, alternatively, manually rotated to bring a different slide into contact with the bevelled slide lifting element 140 with actuation of the SELECT push button 16.

Further rotaion of the cam 104 results in the cam lifter member 134 being rotated counter-clockwise around the shaft 135 under urging of the spring 136. This portion of the camming surface 139 of the cam 104 is designed to enable the slide lifter element 140 and member 134 to be driven into the bottom of the projector gate 62 under the urging of the spring 136 at a speed faster than would occur if the slide lifter element 140 and member 134 were free to drop under the influence of gravity alone. Since the slide lifting element 140 does not have the new slide attached thereto, the new slide to be projected falls into the projector gate 62 under the influence of gravity and not under the influence of the slide lifting element 140. The clockwise and counter-clockwise rotation of the slide lifter member 134 is transverse to the optical path 68 of the projector with the slide lifting element 140 being located approximately midway along the bottom edge of a slide.

The slide tray indexing portion of the slide tray and slide positioning mechanism of this invention can best be understood with reference to FIGS. 3a, 5a, 5b, 5c and 5d. An elongated cam follower 151 (FIG. 5a) has one end 152 thereof rotatably mounted on the shaft 50 that extends through the rectangular housing 41. The other end 153 of the cam follower 151 extends through an elongated opening 163 (FIG. 3a) in the side member 42 of the rectangular housing 41. Intermediate the ends 152 and 153 of surface cam follower 151 is a cam cooperating surfac 155 that is held in engagement with the camming surface 150 of the cam 105 by means of a spring 154 which is coupled between the cam follower 151 and the side 42 of the rectangular housing 41.

Figure 5A:
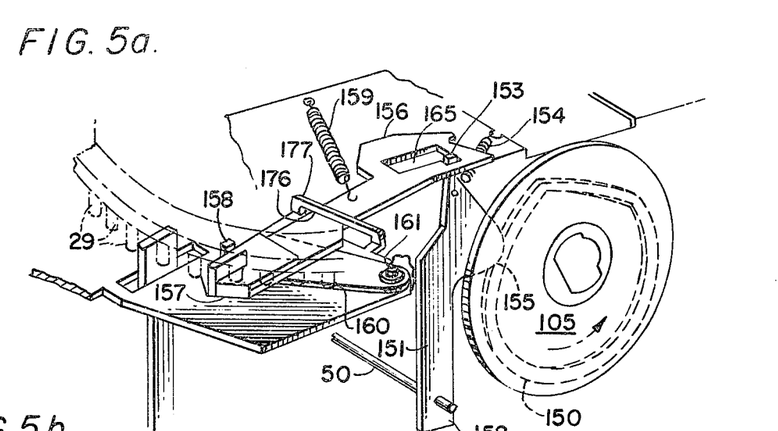
FIG. 5a illustrates the slide tray indexing portion, of the slide tray and slide positioning mechanism of this invention, at one of its operative positions.

Extending through an opening 176 in an upraised portion 177 of the side member 42 is a flat, elongated indexing bar 156. One end of the indexing bar contains an opening 165 having a first portion 164 and a second portion 166 with the end 153 of the cam follower 151 extending through the side member 42 also extending through the first portion 164 of the opening 165 in the indexing bar 156 as shown in FIGS. 3a and 5a. A spring 159 connected between the indexing bar 156 and the side member 42 biases the indexing bar 156 to its initial position against a stop 158 extending from the side member 42 and against the end 153 of the cam follower 151 extending through the opening 163 in the side member 42. Attached to the other end of the indexing bar 156 is a bevelled slide tray indexing element 157. A flat, pivoted member 160 has one end thereof rotatably coupled to the side member 42 by any well known means such as a stud 161 and retaining ring 162. The other end of the pivoted member contains an elongated slot 169 into which extends a guide pin 168 depending from the bottom of the indexing bar 156. (FIG. 3a)

Figure 5B:
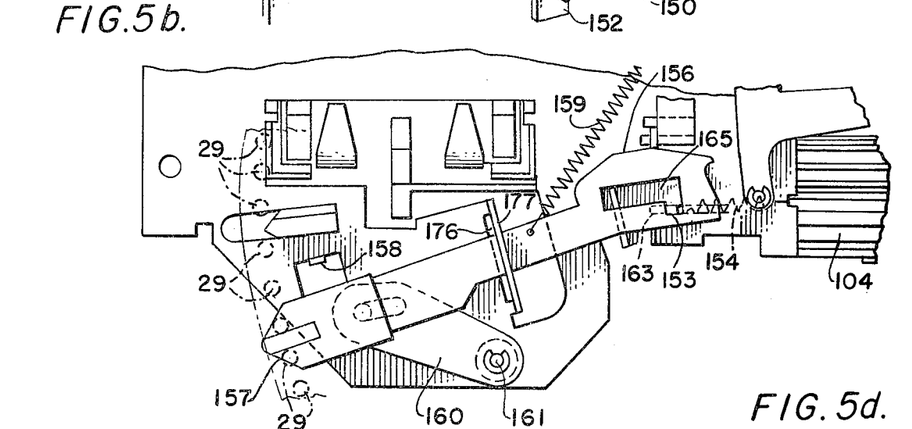
FIG. 5b illustrates the mechanism of FIG. 5a at one of its operative positions.

The camming surface 150 of the tray indexing cam 105 is designed so that shortly after the initiation of a projector cycle, the end 153 of the cam follower 151 is driven in a counter-clockwise (FIG. 5a) around the shaft 50 and within the elongated slot 163 in the side member 42 to bear against the wall of the first portion 164 of the opening 165 in the indexing bar 156 such that the indexing bar 156 is guided forward in a straight line established by a guide 158 upraised from the side 42 of the housing 41 and the end 153 of cam follower 151. This movemment is illustrated by the vector diagram in FIG. 5d as movement of the slide tray indexing element 157 of the indexing bar 156 from the initial position indicated by the reference numeral 171 to a next position indicated by the reference numeral 172. When in the position indicated by reference numeral 172, at which time the pin 168 is located at the end of the elongated slot 169 in the pivoted member 160, the slide tray indexing element 157 on the indexing bar 156 will be positioned between two adjacent indexing pins 29 depending from the slide tray (FIG. 5a). At this time, the slide tray 12 is locked in position by the indexing bar 156 and permits the tray locator mechanism, described above in conjunction with FIG. 4, to be retracted out of engagement with the slide tray 12. After this has occurred, the camming surface 150 of the cam 105 further drives the cam follower 151 in a counter-clockwise direction around the shaft 50 (FIG. 5a). However, since the pin 168 extending from the indexing bar 156 into the elongated slot 169 in the pivoted member 160 can travel no further in the slot 169, continued driving of the indexing bar 156 by the end 153 of the cam follower 151 causes the pivoted member 160 and the indexing bar 156 to be rotated around the pivotal axis 161 of the pivoted member 160 (FIG. 5b). This in turn causes the slide tray indexing element 157 now located between two adjacent indexing pins 29 depending from the slide tray 12, to rotate the slide tray 12. This indexing motion is illustrated by movement of the indexing element 157 between points 172 and 173 in the vector diagram of FIG. 5d. This slide tray movement results in the slide that has been returned into the slide tray lifter portion, described hereinabove, to be moved away from the opening 26 in the bottom 25 of the slide tray 12 which causes the next successive side to be located over the opening 26 in the bottom 25 of the slide tray 12. Downward movement of the slide lifter permits the new slide to be positioned within the projector gate 63. Now that the slide tray 12 has been indexed, the tray locator, described above, re-engages the indexing pins 29 depending from the slide tray 12 to lock the slide tray 12 in position. After this has occurred, the camming surface 150 of the cam 105 is such that clockwise rotation of the cam follower 151 is achieved under urging of the spring 154. This causes the end 153 of the cam follower 151 extending into the first portion 164 of the opening 165 in the indexing bar 156 to drive the indexing bar 156 and the indexing element 157 from between adjacent indexing pins 29 depending from the slide tray 12. This is shown in the vector diagram of FIG. 5d as the travel between points 173 and 174. Once the slide tray indexing element 157 is disengaged from between adjacent indexing pins 29 depending from the slide tray 12, the spring 154 will bias the indexing bar 156 against the stop 158 as is illustrated by the movement between points 174 and 178 in the vector diagram of FIG. 5d. Further movement of the cam follower 151 in the counter-clockwise direction (FIG. 5a) will cause the indexing bar 156 to be driven to its initial position in cooperation with the spring 159 (FIG. 3a) which is shown in the vector diagram of FIG. 5d as the movement between points 178 and 171.

Figures 5C, 5D:
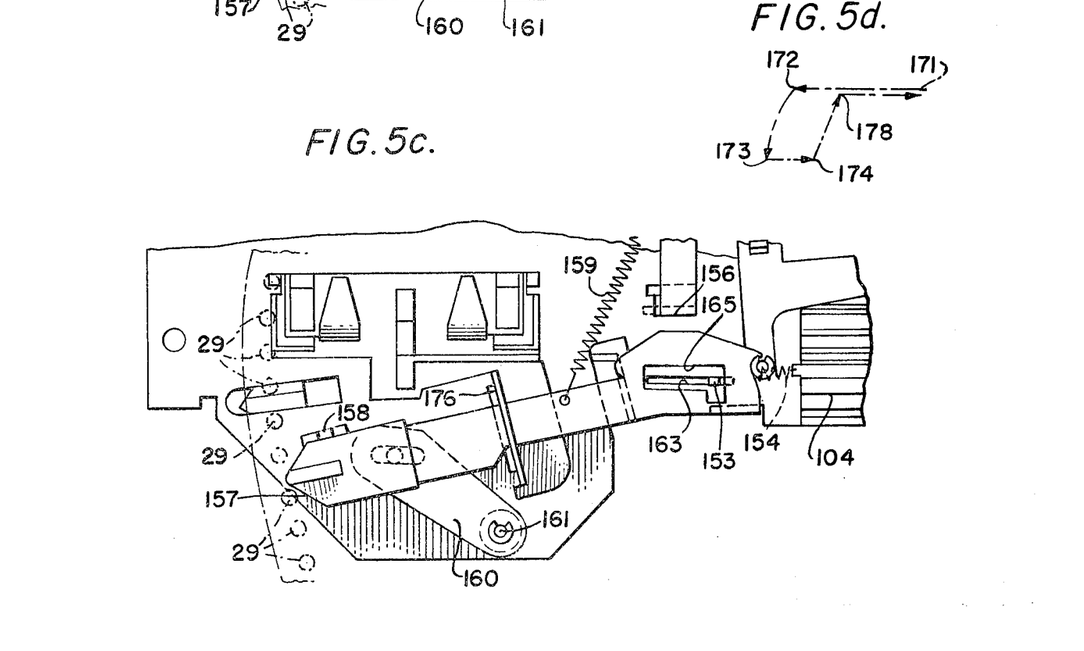
FIG. 5c illustrates the mechanism of FIG. 5a when it is disengaged.
FIG. 5d is a vector diagram that illustrates the movement of the tray indexing end of the tray indexing bar illustrated in FIGS. 5a and 5b.

Although not part of the present invention as claimed, reference to FIG. 3a shows that actuation of the HOLD push button 17 causes the elongated member 85 to engage the end of the indexing bar 156 having the opening 165 therein thereby disengaging the first portion 164 of the opening 165 from the end 153 of the cam follower 151 extending through the elongated opening 163 in the side member 42. When this occurs, the reciprocal movement of the end 153 of the cam follower 151, described hereinabove, will take place within the confines of the second portion 166 of the opening 165 in the indexing bar 156 under the urging of the spring 159 as shown in FIG. 5c. For this situation, reciprocal motion of the end 153 of the cam follower 151 has no affect on the indexing bar 156 which will remain in its initial at rest position out of engagement with the slide tray 12. As will be obvious from the discussion hereinabove, this permits the slide tray 12 to be manually rotated when not locked in position by the tray locator portion (FIG. 4) of the slide tray and slide positioning mechanism. The first portion 164 of the opening 165 will re-engage the end 153 of the cam follower 151 at the end of its reciprocal motion due to the urging of the spring 159 in the indexing bar 156 on the release of push button 17.

Figure 10:
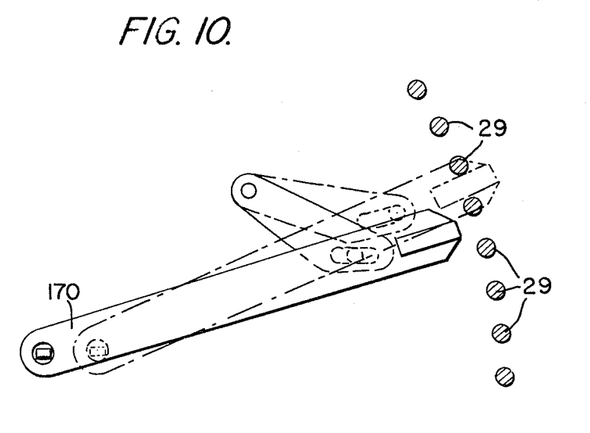
FIG. 10 illustrates another indexing bar that may be utilized in the tray indexing portion of this invention illustrated in FIGS. 5a, 5b and 5c.

In the event that disengagement of the indexing bar 156 from the end 153 of the cam follower 151 is not necessary, or is to be accomplished other than as described above, an indexing bar 170 as shown in FIG. 10 can be utilized. The operation of this indexing bar 170 will be obvious in view of the description contained above.

Disengagement of the indexing means is claimed in co-pending patent application having Ser. No. 364,470, filed on May 29, 1973 also entitled SLIDE TRAY AND SLIDE POSITIONING MECHANISM.

Figure 7A:
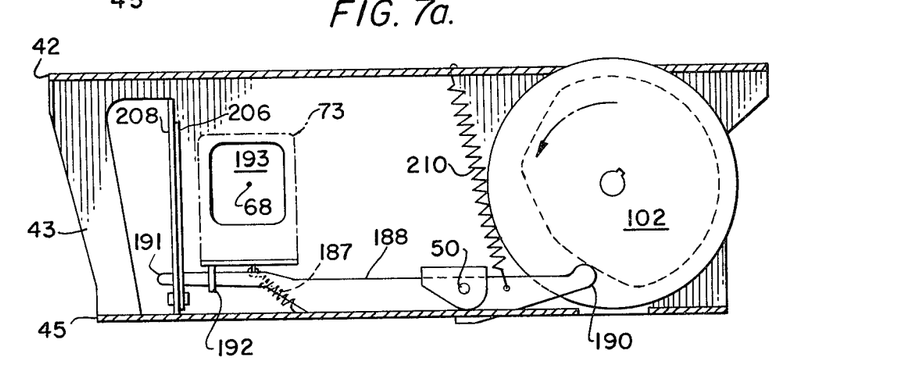
FIG. 7a illustrates part of the shutter and slide clamp portion of the slide tray and slide control mechanism of this invention.

The shutter and slide clamp portion of the slide tray and slide positioning mechanism of this invention is best shown by FIGS. 7a, 7b, 3a, 3b and 3c. A shutter cam follower includes an elongated element 188 rotatably mounted, intermediate the ends thereof, on the shaft 50 that extends through the rectangular housing 41. One end 190 of the shutter cam follower 188 is urged, in a counter-clockwise direction, into engagement with the camming surface 189 of the shutter cam 102 by a spring 210 coupled between the cam follower 188 and the slide member 42 of the rectangular housing 41. The other end 191 of the cam follower 188 extends into an opening 207 (FIG. 7b) formed by a member 208 laterally extending from the side member 43 and into the rectangular housing 41. One side 205 of the member 208 defining the opening 207 is in contact with the end 191 of the cam follower 188 and functions as a guiding surface therefor. The end 191 of the cam follower 188 also includes a shutter camming surface 192 that is in contact with the shutter 73. As shown by FIG. 7a, the shutter cam follower 188 in its initial at rest position is located beneath the optical path 68 of the projector which passes through an opening 193 in the side member 43. Tabs 196 and 195 extending from the side member 43 and out from the housing 41 have a shaft 194 extending therethrough (FIGS. 3b and 3c) around which the shutter 73 is rotatably mounted. A spring 187 (FIG. 7a) extending between the shutter 73 and the side member 43 urges the shutter 73 in a clockwise direction (FIG. 7b) agaynsy the camming surface 192 on the shutter cam follower 188. As shown, the shutter 73 rotates around an axis that is located below and which is substantially transverse to against optical path 68 of the projector.

Figure 7B:
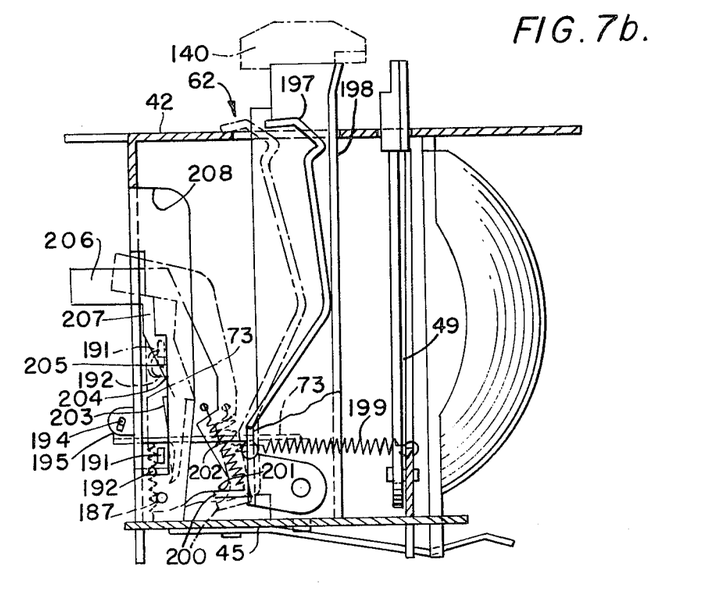
FIg. 7b illustrates another part of the shutter and slide clamp portion of the slide tray and slide control mechanism of this invention.

The projector gate 62 includes a slide guide member 198 (FIGS. 3a and 7b) extending substantially vertically within the projector gate and which provides guiding surfaces for the image slides on each side of the projector optical path 68. Rotatably mounted at the bottom of the guide slide member 198, along an axis located below the optical path 68 of the projector and substantially parallel to the rotational axis of the shutter 73, is a slide clamp 197 which is urged in a clockwise direction (FIG. 7b) against the slide guiding member 198 by a spring 199 connected between the slide clamp 197 and the side 49 of the housing 41. The slide clamp 197 contains a protruding tab 200 at one side thereof which contacts an extension 201 of an actuator clamp 206 which is rotatably mounted to the member 208 near the bottom thereof by any number of well known means (not shown) along an axis below the optical path 68 of the projector and substantially parallel to the rotational axis of the shutter 73. As mounted, the clamp actuator 206 extends in a vertical direction within the projector gate along one side of the optical path 68 of the projector. A spring 202 connected between the clamp actuator 206 and the slide clamp 197 urges the clamp actuator 206 in a clockwise direction (FIG. 7b). The extension 201 of the clamp actuator 206 engaging the tab 200 protruding from the slide clamp 197 limits clockwise rotation of the clamp actuator 206. The clamp actuator 206 includes a camming surface 204 and a latching member 203. The presence of a slide between the slide guide 198 and the slide clamp 197 prevents clockwise rotation of the slide clamp 197 (FIG. 7b) around its rotational axis against the slide guide 198. This positions the tab 200 projecting from the slide clamp 197 at a location that enables clockwise rotation of the clamp actuator 206, under urging of the spring 202 such that the latching member 203 does not extend into the opening 207 formed by the member 208. The absence of a slide between the slide clamp 197 and the slide guide 198 enables further clockwise rotation of the slide clamp 197 with a resulting reduction in the extent of clockwise rotation of the clamp actuator 206 around its rotational axis which causes the latching portion 203 of the clamp actuator 206 to extend into the opening 207.

Operation of the shutter 73 and slide clamp 197 portion of the slide tray and slide positioning mechanism is such that shortly after the initiation of a projector cycle, the shutter cam 192 causes counter-clockwise rotation (FIG. 7b) of the shutter 73 around its rotational axis to block the optical path 68 of the projector. The end 191 of the cam follower 188 moves in a direction transverse to and across the optical path 68 of the projector. The end 191 of the cam follower 188 being located near the axis of rotation of the shutter 73 results in counter-clockwise rotation of the shuttter (FIG. 7b) under urging of the shutter camming surface 192 to a position in which the shutter 73 will block the opening 193 in the side member 43, thereby completely blocking the optical path 68 of the projector, for a relatively small upward movement of the end 191 of the cam shutter follower 188. Subsequent engagement of the end 191 of the cam shutter follower 188 with the camming surface 204 of the clamp actuator 206 causes clockwise rotation of the clamp actuator 206 which results in counter-clockwise rotation of the slide clamp 197 (FIG. 7b). Accordingly, when the shutter camming surface 192 has reached the end of its upward motion, the shutter 73 has been closed and the slide clamp 197 is opened to permit entry of a new image bearing slide into the projector gate 62. The end 191 of the shutter cam follower 188 will remain at the end of its upward motion for a time due to a constant radius portion of the camming surface 189 of the shutter cam 102. After a new slide, if any, has been lowered into the projectr gate 62, the camming surface 189 of the shutter cam 102 is such that counter-clockwise rotation of the shutter cam follower 188 around its rotational axis (FIG. 7a) is achieved under urging of the spring 210. However, if a slide absent in the slide position newly indexed to, the latching member 203 of the clamp acutator 206 will extend into the opening 207, as discussed hereinabove. For this consition, the latching member 203 of the clamp actuator 206 will prevent further downward movement of the end 191 of the shutter cam follower 188. This results in the shutter camming surface 192 retaining the shutter 73 in a position which blocks the optical path 68 of the projector thereby preventing projection of any light on the viewing screen 13. In the event a new slide is entered into the projector gate, the slide clamp 197 cannot rotate against the slide guide 198, as discussed hereinabove, which results in the latching member 203 not appearing in the opening 207 which further results in the end 191 of the cam follower being returned to its initial position under urging of the spring 210. This results in clockwise rotation of the shutter 73 (FIG. 7b) under urging of the shutter spring 187 to its initial position where the shutter does not block the optical path 68 of the projector thereby enabling the image on the slide just entered into the projector gate 62 to appear on the screen 13.

Figure 9:
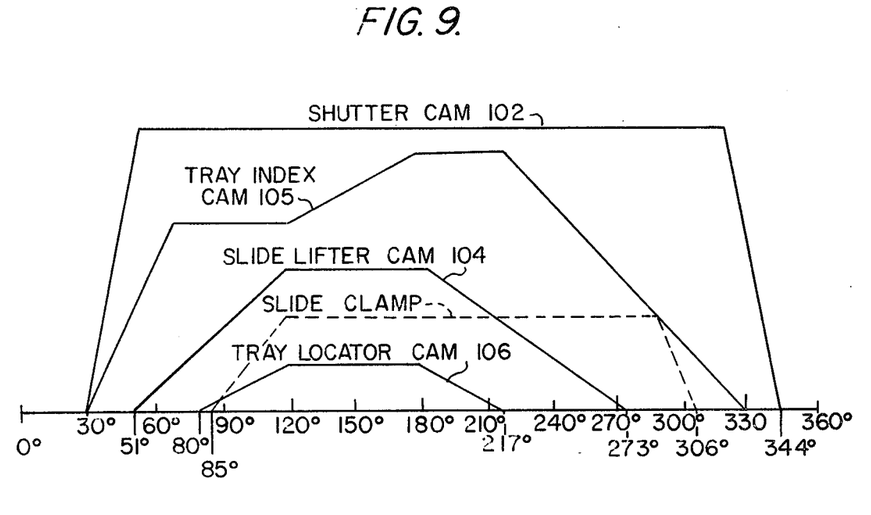
FIG. 9 is a timing chart for the cams used by the slide tray and slide positioning mechanism of this invention.

The time relationship between the various portions of the slide tray and slide positioning mechanism discussed hereinabove will be readily apparent from consideration of FIG. 9 which shows a time diagram for the cams 102, 104, 105 and 106 on the cam block 101.

In the initial at vest position with a slide in the gate 62, the shutter 73 is in the open position, the slide clamp 197 secures the slide in the gate 62, the indexing bar 156 is retracted, the slide lifter (FIG. 6) is at the lower end of its stroke and the tray locating means (FIG. 4) is between two pins 29 depending from the slide tray 12. This condition exits until the cams of the cam block 101 have rotated through about 30° of a 360° cycle. At this point, the shutter 73 starts to close and the tray indexing bar 156 starts to move outward. After a total cam movement of about 51°, the slide lifter starts upward to enter the slide into the slide tray 12. At this point, the slide clamp 197 is still engaged with the slide to assure a straight vertical lift of the slide. The shutter 73 is essentially closed at this point to obscure any movement of the slide from the viewer. At about 70° total cam rotation, the indexing bar 156 has reached its full lateral extension with the indexing element 157 inserted between two pins 29 depending from the slide tray 12. Here the indexing element 157 remains to allow retraction of the tray locator (FIG. 4). At about 80° of total cam rotation, the tray locator starts to withdraw from between adjacent depending pins 29. At about 85° of total cam rotation, the slide has been lifted enough to be well entered into its slide tray 12 compartment and guided thereby. Here the slide clamp 197 starts to retract away from the slide guide 198. At a cam rotation of about 115°, the shutter 73 is closed, the slide has completely entered the slide tray 12, the slide clamp 197 is open to receive another slide, and the tray locator (FIG. 4) is retracted to allow slide tray 12 rotation. At this point (about 115° of cam rotation), the tray indexing element 158 starts to rotate the slide tray 12 to bring the next slide over the projector gate 62. This movement requires approximately 60° of cam rotation, bringing the total cam rotation to 175°. The indexing element 157 now stops its action while still engaged with the tray pins 29 and the tray locator (FIG. 4) starts forward to re-engage the tray pins 29, at about this same point, the slide (FIG. (fIG. 6) starts down to allow the next slide to enter the gate 62. At about 217° of total cam rotation, the tray locator is engaged with the tray indexing pins 29 and the indexing element 157 starts to retract. After 275° of total cam rotation, the slide lifter (FIG. 6) is completely lowered. After about 290° of total cam rotation, the slide clamp 197 starts to close on the new slide. This action requires about 15° of cam rotation to a total of 305°. At about 320° of cam rotaion, the shutter 73 starts to open (the slide being well in place). At a total cam rotation of about 330°, the indexing element 157 is completely retracted. At about 345° of total cam rotation, the shutter 73 is well open and the slide and tray handling functions of the cycle are complete. The cams continue to complete their full 360° of rotation to assume the initial 0° at rest position.

Figures 8A, 8B, 8C:
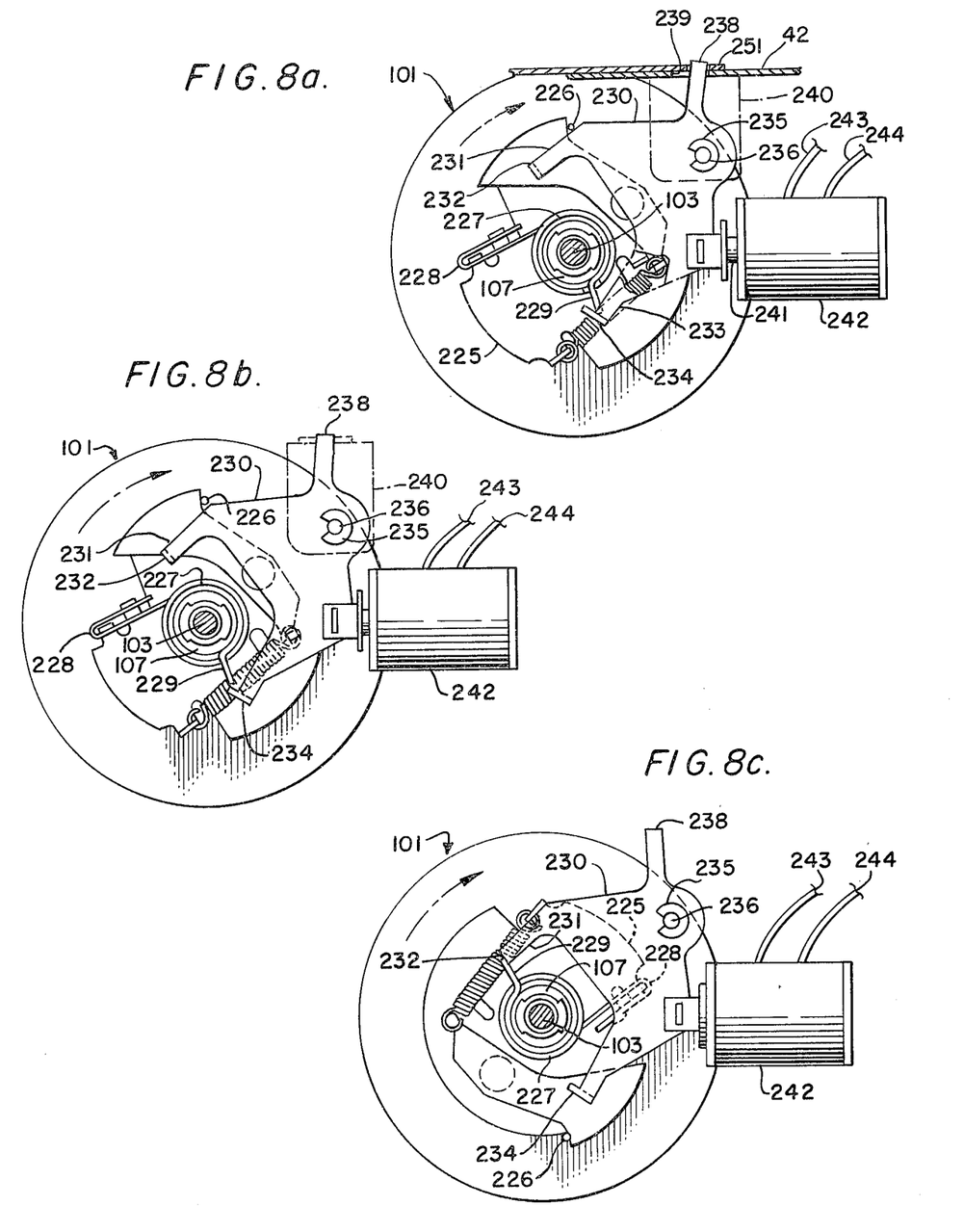
FIGS. 8a, 8b and 8c illustrate various positions of a wrap spring clutch used with the slide tray and slide positioning mechanism of this invention.

The control of a cycle of operation of the rear-screen projector can best be understood by reference to FIGS. 8a, 8b and 8c wherein there is shown a base member 225 which is adapted to rotate the cams 102, 104, 105 and 106 of the slide tray and slide positioning mechanism by engaging the pin 226 extending from the cam block 101. The wrap spring clutch 107 is rotatably mounted on the shaft 103 that extends through the cam block 101 and includes a spring 227 one end 228 of which is secured to the base member 225 while the other end 229 of the spring 227 extends nearly perpendicularly from the clutch 107 as shown. The operation of the clutch 108 is such that clockwise rotational motion coupled thereto from the motor 76 is imparted to the cam block 101 by way of the base member 225 only if the end 229 of the spring 227 is free to rotate. Accordingly, blocking the rotational movement of the end 229 of the spring 227 will prevent rotation of the cam block 101 by opening the clutch 107.

An escapement 230 is rotatably mounted on a member 240, located within the rectangular housing 41 and depending from the side 42 member of the housing 41, by any suitable means such as a stud 236 and retaining ring 235. The escapement 230 includes a first portion 233 having a tab 234 laterally extending from the end thereof which may be placed in the path of rotation of the end 229 of the spring 227 (FIG. 8a). A second portion 231 of the escapement 230 also contains a tab 232 that depends from the end thereof and which may also be placed in the path of rotation of the end 229 of the spring 227 (FIG. 8c). A third portion 238 of the escapement 230 extends through an opening 239 in the side 42 of the rectangular housing 41 (FIG. 3a). The escapement 230 is biased to an initial at rest position shown in FIG. 8a by being coupled to the spring biased plunger 241 of a solenoid 242 which is secured within the rectangular housing 41 by any well known means (not shown).

As will be seen from a persual of FIG. 8a, the initial at rest position of the escapement 230 causes the tab 234 to prevent rotation of the end 229 of the spring 227 thereby preventing rotation of the cam block 101.

An electrical pulse applied to the solenoid 242 by way of electrical leads 243 and 244 will cause the plunger 241 to be withdrawn, thereby causing counterclockwise rotation of the escapement 230 around the pin 236 to the position shown in FIG. 8c. This causes the tab 234 to move out of the path of rotation of the end 229 of the spring 227 thereby imparting rotary motion to the cam block 101. However, the tab 232 will now be in the path of rotation of the end 229 of the spring 227. If the length of the pulse applied to the solenoid 242 has a time duration which is less than the time to complete half of a projector cycle, the escapement 230 will return to the position illustrated in FIG. 8a under the urging of the plunger 241 before the end 229 of the spring 227 arrives at the vicinity of the tab 232 thereby permitting a full projector cycle to take place before further rotation of the end 229 of the spring 227 is prohibited by the tab 234. If the electrical pulse applied to the solenoid 242 has a time duration greater than that required by half of a projector cycle, the tab 232 will block further rotation of the end 229 of the spring 227 after about 160° of rotaton. The slide tray and slide positioning mechanism will remain in the state illustrated by FIG. 9 for about 160° of rotation until the termination of the pulse applied to the solenoid 242, after which the remaining half cycle will take place.

The electrical pulses applied to the solenoid 242 may be provided by the cue tract of the cassette tape or by the hand held control element coupled to the rear-screen projector, which were described hereinabove.

As best seen in FIG. 3a, the portion 238 of the escapement 230 extending through the rectangular housing 41 also extends through an opening 250 in a lever 251 which is pivotly mounted on the rectangular housing 41 by any well known means such as stud 252 and retaining ring 253. Actuation of the ADVANCE push button 15 results in clockwise rotation of the lever 251 around the pin 252 causing counter-clockwise rotation of the escapement 230 around the pin 236 to the position illustrated in FIG. 8b. In this position, both the tabs 234 and 232 are out of the path of rotation of the end 229 of the spring 227. Accordingly, if the ADVANCE push button 15 remains depressed, the projector will execute successive projector cycles. Once the ADVANCE push button 15 is released, however, the solenoid 242 plunger 241 will rotate the escapement 230 to its initial position where the tab 234 will prevent further rotation of the end 229 of the spring 227 after completion of the last initiated projector cycle. Conversely, actuation of the ADVANCE push button 15 and then substantially immediate release thereof will release the end 229 of the spring 227 for one complete revolution that results in one projector cycle.

Actuation of the SELECT push button 16 (FIG. 3a), however, since it is located closer to the axis of rotation of the lever 251 and has a path of travel equal to the ADVANCE push button 15, results in rotation of the escapement 230 to the position illustrated in FIG. 8c. If the SELECT push button 16 is held depressed, only half of a projector cycle takes place. As shown by FIG. 3a, actuation of the SELECT push button also actuates the HOLD push button 17 which disables the indexing bar 156. As shown by FIG. 9, after about 160° of rotating all of the slide tray and slide positioning mechanisms are at a stable position. Since the slide tray indexing bar 156 is disabled, the slide tray 12 is not locked thereby enabling it to be manually rotated to any desired position. Release of the SELECT push button 16 causes the remaining half of the projector cycle to take place.

Actuation of the HOLD push button 17, as shown in FIG. 3a, only disengages the indexing bar 156 and has no affect on the escapement 230. Accordingly, once the HOLD push button 17 is depressed to disable the tray indexing mechanism, the projector cycle (s) takes place without indexing of the slide tray.

Other embodiments and modifications of the invention described hereinabove will be apparent to thos skilled in the art without departing from the spirit and scope of this invention as defined by the following claims.

What is claimed is:
1. Apparatus for projecting slides comprising:
a slide projector;
a slide tray, including a plurality of indexing pins depending therefrom, removably mounted on said projector and adapted to contain a plurality of slides for projection by said projector;
said projector including:
a gate;
said gate including a flat shutter member rotatably mounted near one end thereof about an axis in a plane substantially normal to the optical path of said projector;
said shutter having a first position blocking hte optical path of said projector and a second position for which the optical path of the projector is not blocked;
indexing means adapted to rotate said slide tray relative to said gate for successively bringing slides in said slide tray, one at a time, into substantially vertical registration with said projector gate; and
first means operating in time relation with said indexing means for successively feeding said slides substantially vertically from said tray into said gate under the influence of gravity, for projection, and from said gate substantially vertically back into said tray;
said indexing means including:
a driven indexing bar having a slide tray indexing element at one end thereof;
pivoted means including a rotatably pivoted, substantially flat, member having a slot therein a distance from said pivot coupled to said indexing bar by means of a pin depending from said driven indexing bar and extending into said slot in said pivoted member; said pivoted member guiding said indexing element to a position between two adjacent pins depending from said slide tray and then rotating said indexing bar around the pivot of said pivoted means to rotate said slide tray as said indexing bar is driven; and
second means in time relation with said indexing for causing said shutter to be in its first position in response to the absence of a slide in said gate and for causing said shutter to be in its second position in response to the presence of a slide in said gate;
said second means including:
means biasing said shutter in said second position;
means for rotating said shutter around said rotational axis to said first position in opposition to said biasing means and for enabling counter-rotation of said shutter around said rotational axis to said second position under the urging of said biasing means;
said means for rotating said shutter including an elongated member having a camming surface thereon in contact with the flat surface of said shutter member;
said elongated member adapted to be reciprocated in a direction transverse to the optical axis of said projector and in a plane substantially parallel to the rotational axis of said shutter with said camming surface in contact with the flat surface of said shutter to rotate said shutter to said first position;
means for sensing the absence of a slide in said gate for latching said elongated member in a position wherein said shutter is at said first position and for sensing the presence of a slide in said gate for enabling the return of said shutter to said second position;
a stationary slide guide located at said projector gate;
a slide clamp rotatably mounted on an axis in a plane substantially normal to the axis of said optical path; and
means biasing said slide clamp toward said slide guide.

2. The apparatus to claim 1 further including:
a housing;
said projector within said housing;
said slide tray located on the exteriro exterior said housing;
said housing including a display surface for viewing the projected image of said slides; and means contained within said housing for folding the optical path of said projector at least once.

3. The apparatus according to claim 2 further including:
manually actuated means mounted on said housing for selectively actuating said projector.

4. The apparatus according to claim 1 further including:
means biasing said driven indexing bar to an initial position where the pin depending from said driven indexing bar is adjacent one end of said elongated slot in said pivoted member; and
said pin depending from said driven indexing bar positioned at the other end of said elongated slot in said pivoted member when said indexing element of said driven indexing bar is positioned between two adjacent indexing pins depending from said slide tray.

5. The apparatus according to claim 1 wherein:
said indexing bar includes an opening therein located a distance from said indexing element; and
a driving member extending through said opening for driving said indexing bar.

6. The apparatus according to claim 5 wherein:
said driving member has reciprocal motion.

7. The apparatus according to claim 1 further including:
actuator means rotatably mounted on an axis in a plane substantially normal to said optical axis and coupled to said slide clamp to be rotated to a first position when there is a slide positioned between said slide guide and said slide clmap and to be rotated to a secnd position in the absence of a slide between said slide guide and said guide clamp.

8. The apparatus according to claim 7 wherein:
said actuator presents a latching surface to said means for rotating said shutter to prevent counter-rotation of said shutter to its said second position whenever said actuator is at its second position.

9. The apparatus according to claim 8 further incuding:
means biasing said actuator means to its said second position thereby preventing said latching surface from inhibiting counter-rotation of said shutter whenever a slide is present between said slide guide and said slide clamp.

10. The apparatus according to claim 7 wherein:
the axis of rotation of said actuator means is substantially parallel to the axis of rotation of said slide clamp.

11. The apparatus according to claim 7 wherein:
the axis of rotation of said slide clamp and said actuator means are substantially parallel to the axis of rotation of said shutter.

12. The apparatus according to claim 7 wherein:
said slide clamp is situated between said slide guide and said shutter.

13. The apparatus according to claim 12 wherein:
said actuator means is situated along side of said shutter.

14. The apparatus according to claim 13 wherein:
said means for rotating said shutter has a path of movement between said shutter and said actuator means.

15. The apparatus according to claim 14 wherein:
said projector gate includes a surface along the direction of movment of said means for rotating said shutter for guiding said means for rotating said shutter.

* * * * *